United States Patent [19]

Lamort

[11] Patent Number: 4,604,193
[45] Date of Patent: Aug. 5, 1986

[54] METHOD AND APPARATUS FOR SORTING OUT A MIXTURE OF PAPER PULP AND CONTAMINANTS

[75] Inventor: Jean-Pierre J. Lamort, Saint Lumier en Champagne, France

[73] Assignee: E et M Lamort S.A., France

[21] Appl. No.: 592,525

[22] Filed: Mar. 23, 1984

[30] Foreign Application Priority Data

Mar. 25, 1983 [FR] France ................................. 83 04929

[51] Int. Cl.$^4$ .............................................. B07B 1/04
[52] U.S. Cl. ................................... 209/273; 209/379; 209/253; 209/240; 162/55
[58] Field of Search ............... 366/325, 330, 279, 314, 366/205; 209/13, 17, 253, 273, 271, 268, 283, 240, 279, 379, 389, 359, 324; 241/292.1, 293, 296, 46.02, 46.04, 46.17, 46.11, 70; 416/238; 162/55, 4, 261

[56] References Cited

U.S. PATENT DOCUMENTS

| | | | |
|---|---|---|---|
| 2,424,726 | 7/1947 | Wells | 241/46.11 |
| 2,561,013 | 7/1951 | Coghill et al. | 162/261 |
| 2,794,628 | 6/1957 | Fessenden | 241/300.1 |
| 3,081,826 | 3/1963 | Loiseau | 416/238 |
| 3,261,468 | 7/1966 | Dick | 209/273 |
| 3,989,197 | 11/1976 | Neitzel | 241/46.17 |
| 4,109,872 | 8/1978 | Couture | 241/46.11 |
| 4,111,799 | 9/1978 | Concilla | 209/273 |
| 4,129,259 | 12/1978 | Vokes | 241/46.17 |
| 4,135,671 | 1/1979 | Kohrs et al. | 241/46.11 |

FOREIGN PATENT DOCUMENTS

| | | |
|---|---|---|
| 2757175 | 7/1978 | Fed. Rep. of Germany . |
| 2037836 | 7/1980 | United Kingdom ................. 162/55 |
| 2072033 | 9/1981 | United Kingdom . |

Primary Examiner—Frank W. Lutter
Assistant Examiner—William Bond
Attorney, Agent, or Firm—Darby & Darby

[57] ABSTRACT

The invention relates to a method and apparatus for sorting out recycled paper pulp obtained from scrap material containing contaminants in the form of large pieces of foreign material such as plastics, adhesives, pieces of rope and the like.

The invention avoids the need to disintegrate such large pieces of foreign material prior to their removal.

The device of the invention comprises a drum (1) with an horizontal axis (2), an end wall (3) of the drum being fitted with a perforated plate (4) and an helical stirrer (5) having profiled blades rotating in a plane parallel to this plate at a short distance thereof, these blades having a transverse cross-section with a hydrodynamic profile adapted for generating a depression in front of the perforated plate, and a leading edge (6) forming a Bernouilli spiral with a constant angle of approximately 30°, the drum (1) comprising a pulp inlet (10) with a valve (11) located opposite the perforated plate, an auxiliary enclosure (7) for recovering accepted pulp behind the perforated plate, connected to the suction side of a pump (8), a water inlet (12) with a valve (13), a vent (16) and a large bottom opening (14) with a valve (15) for discharging the refuse after the accepted pulp has been recovered.

While the above-described device is designed for batch operation, a modified embodiment is provided in which twin units of the above design are associated for continuous operation (1a and 1b, FIG. 5) controlled by a 3-way valve (24) for alternatively feeding contaminated pulp to either sorting unit.

In either case, the refuse is washed clear and water is drained out of the refuse before its discharge, so that it may be readily discarded without further processing, and the stirrer permanently prevents the perforated plate from becoming plugged.

5 Claims, 5 Drawing Figures

METHOD AND APPARATUS FOR SORTING OUT A MIXTURE OF PAPER PULP AND CONTAMINANTS

This invention relates to a method and apparatus for sorting out a mixture of paper pulp and contaminants. More specifically, it relates to a method and apparatus for removing contaminants out of recycled paper pulp, obtained from scrap material.

The recovery and reuse of scrap paper has become an increasingly important factor in paper production. However, it gives rise to increasingly difficult problems due to the nature of contaminants which are mixed with recycled papers, particularly plastic coatings, pieces of rope, glues, adhesives, etc.

This invention is particularly concerned with the removal of the larger pieces of foreign material which accompany the recycled paper pulp, without the need to disintegrate these large pieces of contaminants prior to their removal.

BACKGROUND OF THE INVENTION

In pulp recycling operations, scrap paper is most often shredded and mixed with water, in devices known as primary pulpers. Some of these devices are shaped as a container, the bottom part of which is provided with a rotating stirrer-disintegrator member placed on top of a perforated grid. This grid gives passage to a pulp which is still in a crude and soiled condition and it thereafter sent on to a secondary sorting apparatus, such as the one described in U.S. Pat. No. 4,200,537 granted Apr. 29, 1980 (French Patent Pub. No. 2,410,081 Del. Oct. 11, 1982).

Oversize material accumulating on this grid will gradually cause a plugging of the grid, so that it will need to be cleared out. According to a recent technique, this refuse material is evacuated from the lower part of the grid and is then washed in a closed apparatus such as described in U.S. Pat. Nos. 4,369,093 granted Jan. 1, 1983, and 4,493,296 granted Apr. 17, 1984 (French Patent Pub. No. 2,411,681 Del. Jan. 17, 1983).

According to this technique and using this equipment, the recovered pulp is recycled to the primary pulper while the washed-out refuse material is discarded. In fact, the product being fed to this device from the primary pulper is not sufficiently disintegrated, while this device itself has a high disintegrating power, bringing about the need to pass the recovered pulp once more through the primary pulper.

Other types of equipment for the preparation of scrap paper, particularly those known as helix or "helico" pulpers, are not provided with a grid, and have no sorting action whatever, not even a crude one. They merely operate a disintegration, bringing the paper fibers to form a suspension in the presence of water without altering the contaminants which retain their dimensions and shape. These devices deliver a mixture containing approximately 15% to 20% dry material, which is then discharged into a large open vat where it is stirred by means of a stirrer, water being added until the dry material concentration drops to about 5%. The product is then pumped out by means of a special pump for being fed to a continuously operating separator of the screening trommel or vibrating sieve type. This sort of equipment requires a pump being capable of absorbing large pieces of contaminants, and a pump of this kind is subject to frequent breakdowns.

On another hand, devices such as screening trommels or vibrating screens have only a small throughput, so that the above mentioned pump must work with a small flow, which leads to the adoption of volumetric pumps. Such pumps are very costly and put a heavy strain on the installation costs.

This invention has the purpose of providing a method and apparatus for solving the above-mentioned drawbacks.

SUMMARY OF THE INVENTION

According to the method of the invention, the mixture resulting from a scrap paper disintegrating operation or from a pulp grading operation is discontinuously transferred in batches into a closed volume having the shape of a drum or of a volume of revolution with an approximately horizontal axis, said volume comprising an approximately vertical septum provided with a perforated plate in front of which rotates a stirring member having the shape of an helix with streamlined blades moving in a plane parallel to said perforated plate in close vicinity thereto, said blades having a cross-section with an hydrodynamic profile appropriate for generating a depression in front of the perforated plate at each passing of blades, said blades having a leading edge shaped so as to form a Bernouilli spiral with a constant angle of approximately 30°, said volume comprising an inlet controlled by a valve, located opposite to the perforated plate, an auxiliary volume for the recovery of accepted pulp, located behind the perforated plate subjected to suction from a pump, water being added to the mixture during its introduction, the addition of water being continued after closing the inlet valve until the refuse has been washed clear, the water input being then interrupted and water being drained out of the volume by the above-mentioned suction pump, the refuse being finally discharged by gravity through a wide opening at the bottom of said volume.

This process is then repeated with a fresh batch of the mixture.

The device according to this invention is characterized by the fact that it is composed of a closed volume having the shape of a drum or of a volume of revolution with an approximately horizontal axis, said volume comprising an approximately vertical septum provided with a perforated plate in front of which rotates a stirring member having the shape of an helix with streamlined blades moving in a plane parallel to said perforated plate in close vicinity thereto, said blades having a cross-section with an hydrodynamic profile adapted for generating a depression in front of the perforated plate at each passing of blades, said blades having a leading edge shaped so as to form a Bernouilli spiral with a constant angle of approximately 30°, said volume comprising an inlet controlled by a valve, located opposite to the perforated plate, an auxiliary volume for the recovery of accepted pulp, located behind the perforated plate and susceptible of being connected to the suction side of a pump, said volume further comprising a water inlet controlled by a valve and venting means, as well as a wide lower aperture in the bottom section of said drum and a valve for controlling said aperture.

By a Bernouilli spiral with an angle of approximately 30° is meant a spiral wherein the tangent in any point forms a 30° angle with the tangent to the circle passing through said point.

Further features of the method and device according to this invention are :

the discontinuous operation through which definite batches of a mixture of pulp with contaminants are treated sequentially, the fact of operating without either dividing or shredding the components of this mixture, the only function of the blades being to continuously unblock the perforated plate, their shape being such that foreign materials will slide along the blades and will be prevented against accumulating on said blades, the fact of operating with a washing action in which the pulp is gradually drawn out through the grid, while added water gradually washes the refuse until pulp has been eliminated therefrom, the fact of extracting refuse material which has been washed and from which water has been largely removed, so that this waste material is only slightly pollutant.

According to a first embodiment, the device has the shape of a cylinder or drum with an horizontal axis, in which the perforated plate is a disk placed on a side wall, while the inlet for the mixture which has to be sorted out is placed axially on the opposite wall.

The inlet of this device may be directly connected to the delivery end of a primary pulper such as a pulper of the "helico" type. In this event, the inlet port will be kept open while the stirrer is rotating and while water is being added, either until the full contents of the pulper will have been treated, or else until the volume of refuse material reaches a size considered as sufficient or maximum.

The inlet port will then be shut off and washing will be continued until pulp is eliminated. The water feed will then be interrupted until the device is emptied. Refuse material is then discarded and a new operation may be started.

According to a second embodiment, there are provided twin devices of the above-described type, with a three-way valve for alternatively feeding to either unit the mixture which is to be sorted.

This arrangement lends itself to a continuous operation of the system, each unit being sequentially connected to the feed pipe.

This twin apparatus may be connected to the outlet of a device which will continuously deliver a relatively contaminated mixture of paper pulp and foreign materials.

In this case, the input may be tangential, rather than axial, the need for generating a vortex being lessened owing to the fact that the pulp which has to be treated does not contain any very large pieces of foreign matter.

The invention will now be described in greater detail, with reference to the drawing in which:

DETAILED DESCRIPTION OF THE INVENTION

Figure 1:
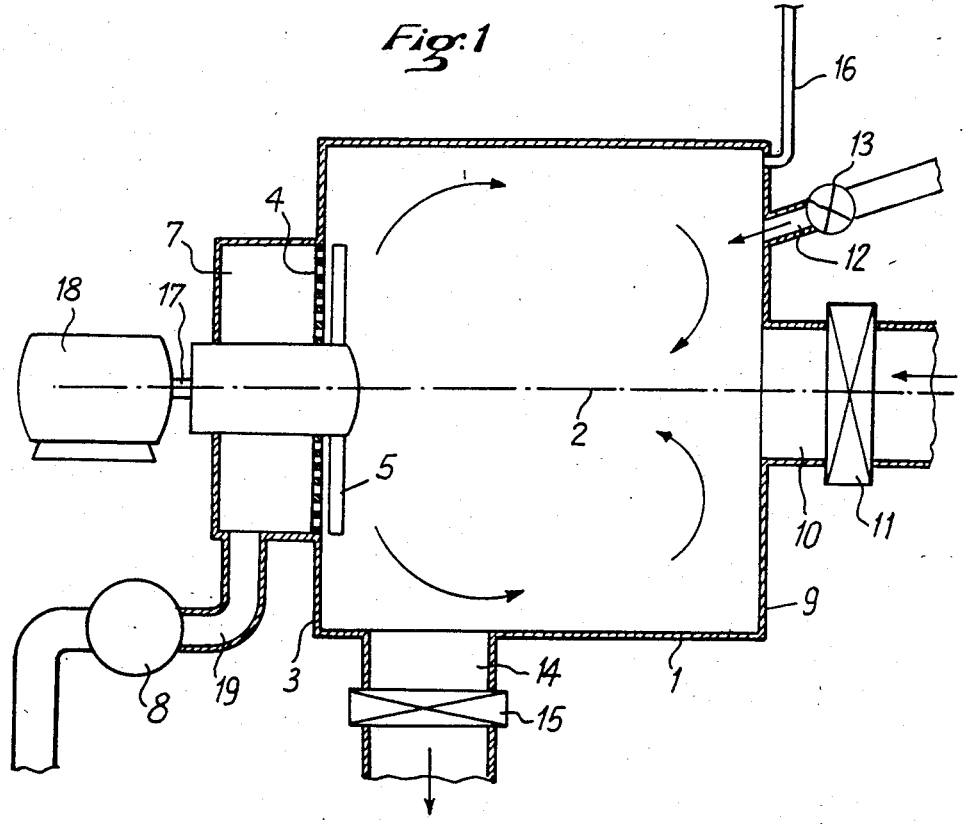
FIG. 1 is a diagrammatical cross-section of an embodiment of the device according to the invention.

Referring to FIG. 1, the device according to this invention comprises a closed volume 1 having the shape of a cylindrical drum (FIG. 1) or of a volume of revolution (FIG. 5) with an approximately horizontal axis 2. This unit is provided with an approximately vertical wall 3 equipped with a perforated plate 4 in front of which is rotatably mounted a stirrer 5. This plate 4 may fill the whole area of wall 3.

Figure 3:
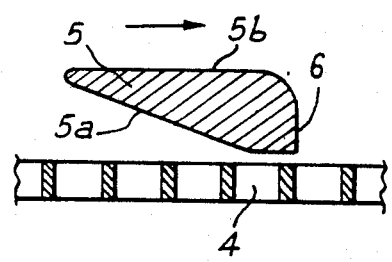
FIG. 3 is a cross-section through a stirrer blade.

The stirrer is devoid of any disintegrator or pulper effect. For this purpose, it is equipped with blades 5, the section of which (FIG. 3) has an hydrodynamic profile designed for generating a depression in front of grid 4 at each passage of a blade. The leading edge 6 is approximately perpendicular to plate 4 along the junction line of this edge with the internal face 5a, close to plate 4, the profile being rounded only along the junction line of the leading edge 6 with the outer face 5b, so as to avoid shearing the material and at the same time preventing a jamming of this material.

The design of the stirrer blades, in respect of their orientation or profile for generating a depression in front of the grid at each passage of a blade, is within the reach of anybody skilled in the art.

Figure 2:
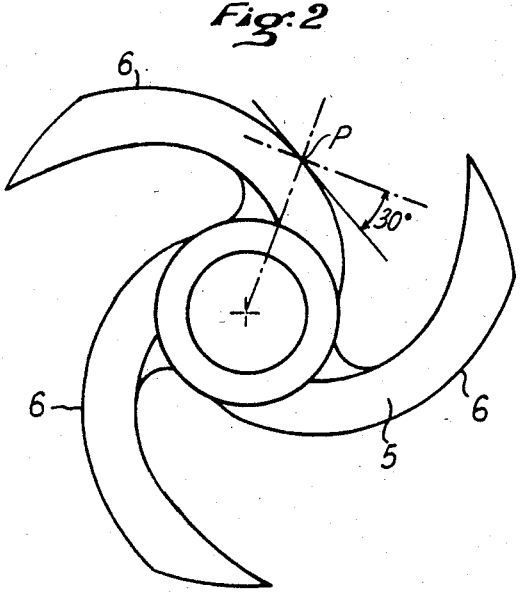
FIG. 2 is a planar view of the stirrer.

As a further feature shown in FIG. 2, the profile of the leading edge 6 is designed as a spiral in which the tangent in any point P forms a constant angle of about 30° with the tangent to the circle passing through point P. With this profile, foreign material is prevented from clinging to the blades 5, as it will slide off and be released from the blade tips.

A gap of a few millimetres is provided between blades 5 and grid 4, so as to avoid foreign substances being sheared between blades 5 and grid 4.

Downstream of grid 4 is provided a volume 7, the outlet 19 of which is connected to the suction side of a pump 8 which generates a depression in this volume 7. The feed inlet 10 is provided with a valve 11 and is located on face 9 opposite grid 4. The apparatus is further provided with a water inlet 12 controlled by a valve 13, with a large bottom aperture 14 controlled by a valve 15, and with a vent 16. The stirrer shaft 17 is driven by a motor 18.

Figure 4:
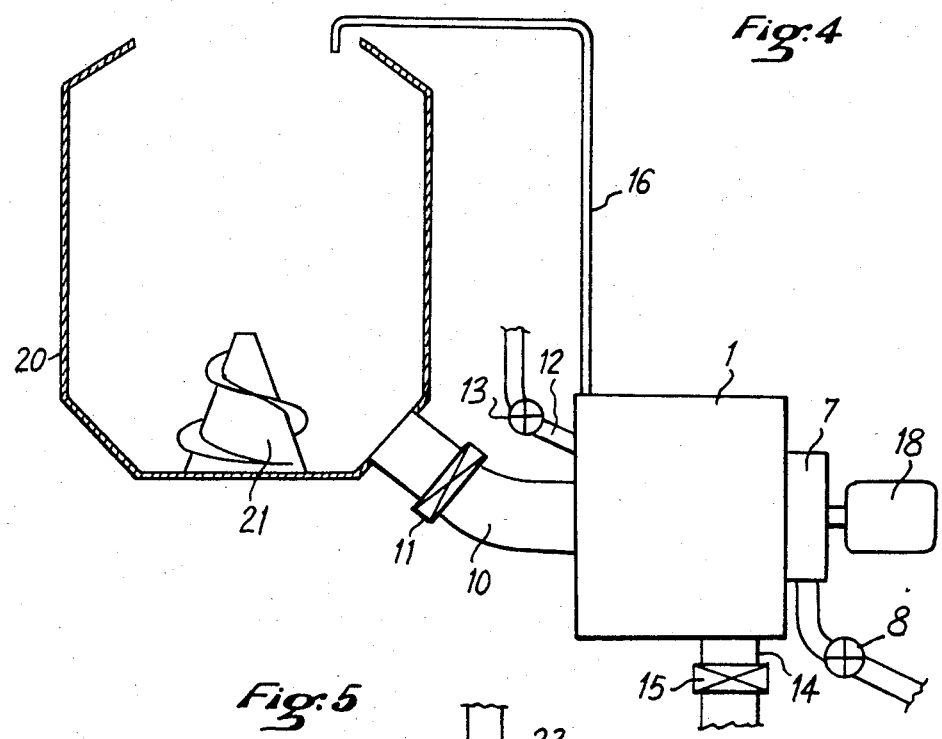
FIG. 4 shows the arrangement of the device of the invention placed downstream of a primary pulper.

In the example shown in FIG. 1, the inlet 10 is located axially opposite to grid 4. This type of apparatus is particularly suitable for sorting out heavily contaminated pulp, such as the mixture delivered from a primary pulper which has no separation effect, such as, more particularly, a pulper 20 with an helix 21 (FIG. 4).

The method according to this invention is as follows: After scrap paper has been disintegrated by pulper 20, valve 11 is opened and the mixture containing approximately 15 to 20% dry material is poured into the drum 1, which has previously been filled with water. Valve 15 being closed, pump 8 is started and water valve 13 is opened. The accepted pulp is withdrawn through outlet 19, its dry material content being then about 5%. Pulper 20 is gradually drained out. When this pulper is partly or completely emptied, depending on the capacity of drum 1, the water supply is continued by leaving valve 13 open, and the rotation of stirrer 5 is also continued, so that refuse is gradually washed. When water extracted by pump 8 is practically devoid of pulp, the water inlet valve 13 is closed and pump 8 empties the drum 1, air being allowed in through vent 16. When the device is empty, pump 8 is stopped, valve 15 is opened, and the refuse is removed by gravity and discarded.

It will thus be seen that the device operates discontinuously, both through the inlet 11 and through the refuse outlet 15. It will also be seen that this device achieves a complete treatment of refuse material, which is finally devoid of pulp and water, so that it may be discarded without further treatment separation or washing. On the contrary, it does not achieve a final treatment of the pulp. It will further be noticed that, while the pulp drawn out by pump 8 may contain residual contaminants, this pulp has been freed from every large piece of foreign material, so that pump 8 may be of a conventional type, without needing to have any special features for letting through such large pieces of foreign material.

Figure 5:
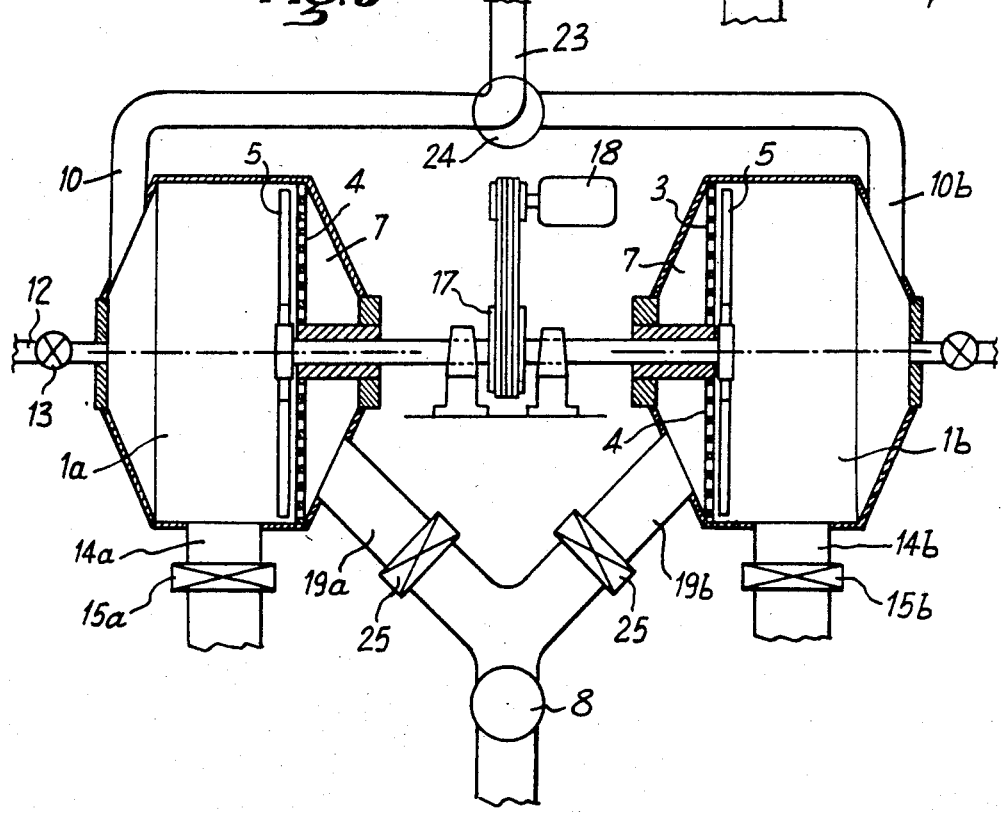
FIG. 5 shows a modified embodiment in the form of twin devices.

FIG. 5 shows a twin device designed for processing pulp delivered from a continuously operating grader. It is formed of twinned units 1a and 1b, the pulp inlets 10a and 10b of which are fed from a common duct 23 through a 3-way valve 24. The suction side of pump 8 is connected to both outlets 19a and 19b of the twin units, or else, in a modified embodiment, a separate pump 8 may be provided for each unit.

The operation of the twin device is as follows: A first batch of pulp is processed, for instance in unit 1a, in the way described above with FIG. 1-4. Just before starting the refuse rinsing operation, valve 24 is switched so as to direct the pulp flow towards unit 1b which has already been filled with water. Water supply to unit 1a is continued, while pump 8 is simultaneously drawing out pulp from both units 1a and 1b. When the washing of refuse in unit 1a is completed, the corresponding water feed valve 13 is closed, and pump 8 drains water out of unit 1a, at the same time continuing to draw out pulp from unit 1b. When water has been emptied out of unit 1a, the refuse outlet 15a of this unit is opened. After the release of the refuse material, valve 15a is closed again, unit 1a is again filled with water and is ready for its next operation, when the 3-way valve 24 will be switched around. Valves 25 may also be provided on the pulp outlets 19a and 19b.

What is claimed is:

1. A batch processing device for washing and separating contaminants from a mixture including paper pulp comprising:
    a container having an approximately horizontal axis and first and second opposed ends, said horizontal axis running through said ends, said container further having upper and lower sides;
    an approximately vertical wall having perforations therein disposed at said first end;
    a stirrer for sitrring said mixture without shredding said paper pulp, disposed inside said container, and in front of said perforated wall, said stirrer including blades in a shape of a spiral, said blades roatating in a plane parallel to said plate a short distance therefrom, said blades having a hydrodynamic foil profile adapted for generating a depression in front of said perforated wall upon rotational passage of said blades at each passing of the blades, and having a leading edge shaped as a Bernouli spiral with a constant angle of 30°;
    said pulp container further having a pulp inlet means coupled to a valve and disposed in said second end for conducting pulp into said container;
    a chamber for the recovery of paper pulp, located across said perforated wall from said stirrer;
    a pump, coupled to said chamber, for withdrawing material therefrom;
    water inlet means coupled to a valve and coupled to said container for directing water thereinto;
    vent means coupled to said container for allowing air into said container; and
    an opening disposed in said lower side of said container, coupled to a valve for the removal of said contaminants from said container.

2. A device according to claim 1, characterized by the leading edge (6) of blades (5) being approximately perpendicular to plate (4) along its junction line with the internal face (5a) of the blade lying close to plate (4).

3. A device according to claim 1 or claim 2, characterized by the volume (1) having the shape of a cylindrical drum with an horizontal axis in which the perforated plate (4) is a disk placed on a side wall (3), the inlet (10) of the mixture having to be sorted out being located axially on the opposite wall (9).

4. The device according to claim 3, comprising a second container having an approximately horizontal axis and first and second opposed ends, said horizontal axis running through said ends and firther having upper and lower sides, a second approximately vertical wall having perforations disposed at said second container first end;
    a second stirrer for stirring said mixture without shredding said paper pulp disposed inside said second container and in front of said second perforated wall, said stirrer having the shape of a spiral, said blades rotating in a plane parallel to said wall a short distance therefrom, having a hydrodynamic foil profile adapted to generate a depression in front of said perforated wall upon rotational passage of said blade at each passing of the blades and having a leading edge shaped as a Bernouli spiral with a constant angle of 30°;
    said second container further having second pulp inlet means coupled to a valve and disposed in said second end for conducting pulp into said container;
    a second chamber for the recovery of pulp, located behind said second wall across from said second stirrer;
    a second pump coupled to said second chamber for withdrawing material therefrom;
    second water inlet means coupled to a valve and coupled to said second container;
    second vent means coupled to said container for allowing air therein;
    an opening disposed in said second container lower side and coupled to a valve for removal of said contaminants from said container; and
    a three-way valve coupled to said first and second pulp inlet means for alternately delivering said mixture to said container or said second container.

5. The device according to claims 1 or 2 comprising a second container having an approximately horizontal axis and first and second opposed ends, said horizontal axis running through said ends, said second container further having upper and lower sides, and a second approximately vertical wall having perforations disposed at said second container first end;
    a second stirrer for stirring said mixture without shredding said paper pulp disposed inside said second container and in front of said second perforated wall, said stirrer having the shape of a spiral, said blades rotating in a plane parallel to said wall a short distance therefrom, having a hydrodynamic foil profile adapted to generate a depression in front of said perforated wall upon rotational passage of said blade at each passing of the blades and having a leading edge shaped as a Bernouli spiral with a constant angle of 30°;

said container further having second pulp inlet means coupled to a valve and disposed in said second end for conducting pulp into said second container;

a second chamber for the recovery of pulp, located behind said second wall across from said second sitrrer;

a second pump coupled to said second chamber for withdrawing material therefrom;

second water inlet means coupled to a valve and coupled to said second container;

second vent means coupled to said container for allowing air therein; and an opening disposed in said second container lower side and coupled to a valve for removal of said contaminants from said container;

a threee-way valve coupled to said first and second pulp inlet means for alternately delivering said mixture to said container or said second container.

* * * * *